(12) United States Patent
Oh et al.

(10) Patent No.: US 8,275,597 B1
(45) Date of Patent: Sep. 25, 2012

(54) HIGH SPEED MEMORY SIMULATION

(75) Inventors: Chanhee Oh, Austin, TX (US); John F. Croix, Austin, TX (US); Curtis L. Ratzlaff, Austin, TX (US); Ramon D. Acosta, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 567 days.

(21) Appl. No.: 12/020,871

(22) Filed: Jan. 28, 2008

(51) Int. Cl.
*G06F 17/50* (2006.01)
*G06F 9/54* (2006.01)
*G06F 13/10* (2006.01)
*G06F 13/12* (2006.01)
*G06G 7/62* (2006.01)
*G06G 7/54* (2006.01)

(52) U.S. Cl. ........................................ 703/14
(58) Field of Classification Search .............. 703/13–21
See application file for complete search history.

(56) References Cited

U.S. PATENT DOCUMENTS

| | | | |
|---|---|---|---|
| 6,053,948 A | 4/2000 | Vaidyanathan et al. | |
| 6,249,901 B1 | 6/2001 | Yuan et al. | |
| 6,577,992 B1 | 6/2003 | Tcherniaev et al. | |
| 6,671,207 B1* | 12/2003 | Parker | 365/185.22 |
| 6,738,953 B1* | 5/2004 | Sabharwal et al. | 716/103 |
| 6,791,880 B1* | 9/2004 | Kurihara et al. | 365/185.21 |
| 6,807,520 B1* | 10/2004 | Zhou et al. | 703/14 |
| 6,820,643 B2 | 11/2004 | Giordano | |
| 7,082,067 B2* | 7/2006 | Venkatraman et al. | 365/201 |
| 7,082,389 B2* | 7/2006 | Nahas | 703/13 |
| 7,197,438 B1* | 3/2007 | Mehta et al. | 703/2 |
| 7,266,486 B2* | 9/2007 | Nahas | 703/13 |
| 2005/0149312 A1 | 7/2005 | McGaughy | |
| 2006/0120167 A1* | 6/2006 | Bhadra et al. | 365/189.01 |
| 2006/0161413 A1* | 7/2006 | Wei et al. | 703/14 |

OTHER PUBLICATIONS

Mamidipaka et al. "Leakage Power Estimation in SRAMS", Sep. 2003.*
Mohan et al. "Analytical and Simulation Studies of Failure Modes in SRAM's Using High Electron Mobility Transistors", IEEE Transactions on Computer-Aided Design of Integrated Circuits and Systems, vol. 12, No. 12, Dec. 1993.*
Do et al. "Parameterizable Architecture-Level SRAM Power Model Using Circuit-Simulation Backend for Leakage Calibration", Proceedings of the 7th International Symposium on Quality Electronic Design (ISQED'06).*
Kao, Russell. "Piecewise Linear Models for Switch-Level Simulation", 1992.*
Do et al. "Table-Based Total Power Consumption Estimation of Memory Arrays for Architects" PATMOS 2004, LNCS 3254, pp. 869-878, 2004.*

(Continued)

*Primary Examiner* — Shambhavi Patel
(74) *Attorney, Agent, or Firm* — Holland & Knight LLP; Brian J. Colandreo, Esq.; Mark H. Whittenberger, Esq.

(57) ABSTRACT

In one embodiment, a method comprises creating a simulation model for a column of bit cells in a memory, simulating the simulation model to generate a result; and displaying the result for a user. Each of the bit cells in the column is coupled to a different wordline, and the simulation model comprises one or more linear elements in place of a nonlinear element in each bit cell that is coupled to an inactive wordline. The one or more linear elements approximate a behavior of the nonlinear element while the wordline is inactive. A computer accessible storage medium storing a simulator that implements the method is contemplated, and the simulator itself is also contemplated, in various embodiments.

29 Claims, 11 Drawing Sheets

OTHER PUBLICATIONS

Hamdioui et al. "Using Linear Tests for Transient Faults in DRAMs", 2006.*

Kim, Nam. "Circuit and Microarchitectural Techniques for Processor On-Chip Cache Leakage Power Reduction", 2006.*

Zhang et al. "Analytical Modeling of SRAM Dynamic Stability", ICCAD'06, Nov. 5-9, 2006.*

"Using Hierarchy and Isomorphism to Accelerate Circuit Simulation," White Paper, Cadence Design Systems, Inc., 2004, 14 pages.

* cited by examiner

Memory State 70

US 8,275,597 B1

HIGH SPEED MEMORY SIMULATION

BACKGROUND

1. Field of the Invention

This invention is related to the field of electronic circuit simulation and, more particularly, to the simulation of memories.

2. Description of the Related Art

Circuit simulation tools provide a way for the circuit designer to simulate the behavior of a complex design, identify any problems, and make alterations and enhancements to the circuit before arriving at a final design. The iterative design process has in turn improved the reliability of the end products that incorporate a given circuit design. One of the most popular circuit simulation tools is the Simulation Program with Integrated Circuit Emphasis (or SPICE). Many commercial versions of SPICE are available. In addition to SPICE-like simulators, functional simulators (which primarily are used to verify logical function of circuits) are often used, such as high level description language (HDL) simulators. HDL simulators include both event-driven simulators and cycle-based simulators.

While considered highly accurate, traditional SPICE is typically too slow for the analysis of large circuits, as the single design matrix that SPICE uses to solve the system of equations describing the circuit can grow quadratically with the number of circuit elements. To work around this limitation, so called "Fast-Spice" simulators in part achieve greater speed by intelligently partitioning a single design matrix into many smaller matrices. These small partition matrices are solved independently, and their solutions combined to form an overall solution. Design partitioning is often based on either channel-connected components or user-defined design hierarchy. A channel-connected component consists of nonlinear elements which are graph-connected through their channel terminals, along with graph-connected linear elements.

One type of simulation that is computationally expensive (both in processor execution time and simulation memory requirements) is a simulation of a memory design. The memory design includes many transistors, each of which is a non-linear element that must be evaluated in each time step via various numerical methods. In order to reduce the effort, some simulators have either simulated a column of the memory and copied the results to other columns, or have reduced the model to only two columns (one storing a logical one and the other storing a logical zero in each bit cell in the column) and have extrapolated the results to other columns. In either case, the model is large because each bit cell in the column includes non-linear elements that must be simulated.

SUMMARY

In one embodiment, a method comprises creating a simulation model for a column of bit cells in a memory, simulating the simulation model to generate a result; and displaying the result for a user. Each of the bit cells in the column is coupled to a different wordline, and the simulation model comprises one or more linear elements in place of a nonlinear element in each bit cell that is coupled to an inactive wordline. The one or more linear elements approximate a behavior of the nonlinear element while the wordline is inactive. A computer accessible storage medium storing a simulator that implements the method is contemplated, and the simulator itself is also contemplated, in various embodiments.

BRIEF DESCRIPTION OF THE DRAWINGS

The following detailed description makes reference to the accompanying drawings, which are now briefly described.

Figure 1:
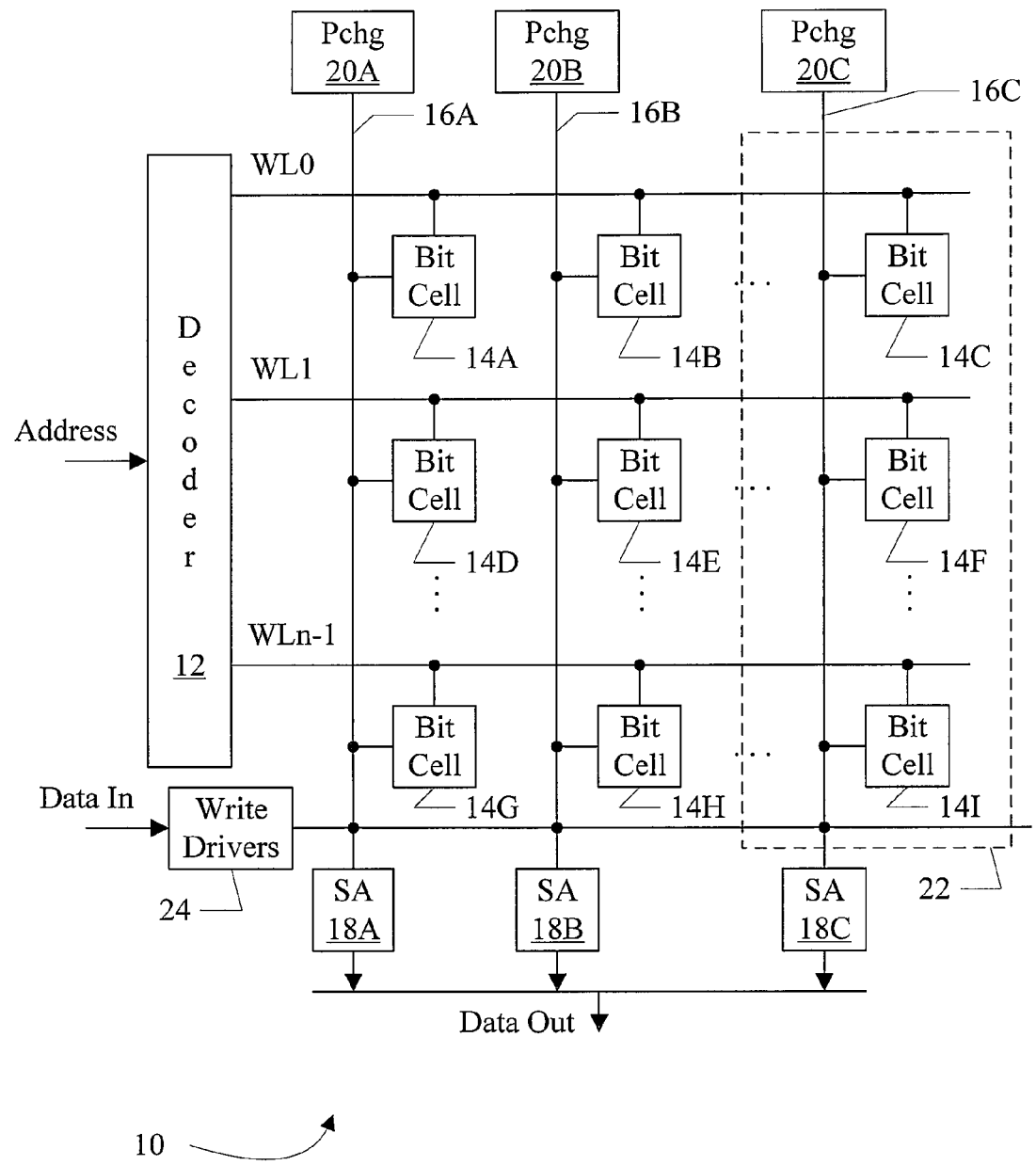
FIG. 1 is a block diagram of one embodiment of a memory.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a memory 10 is shown. In the illustrated embodiment, the memory 10 comprises an address input ("Address" in FIG. 1), a data input ("Data In" in FIG. 1), and a data output ("Data Out" in FIG. 1).

A decoder 12 decodes the address, and generates a set of wordlines WL0 to WLn−1. Each different value of the address causes a different one of the wordlines to be asserted. Accordingly, for any given address provided to the memory 10, one of the wordlines will be asserted and the other wordlines will be deasserted. The asserted wordline is referred to as the "active" wordline, and the deasserted wordlines are referred to as "inactive" wordlines. The asserted/active level and the deasserted/inactive level may vary in different implementations. For example, the active level may be the high voltage (e.g. the power supply voltage, often denoted $V_{DD}$) and the inactive level may be the low voltage (e.g. the ground voltage, often denoted $V_{SS}$ in integrated circuits). Alternatively, the active and inactive voltage levels may be reversed, in other embodiments.

Each wordline is coupled to a set of bit cells (e.g. wordline WL0 is coupled to bit cells 14A, 14B, and 14C; wordline WL1 is coupled to bit cells 14D, 14E, and 14F; and wordline WLn−1 is coupled to bit cells 14G, 14H, and 14I). Other wordlines (not shown in FIG. 1) are coupled to other sets of bit cells (not shown in FIG. 1) in a similar fashion. Any number of wordlines and corresponding bit cells may be provided, in various implementations. The bit cells coupled to an active wordline are read or written in response to the address (and further in response to control signals indicating read/write, not shown in FIG. 1). The bit cells that are coupled to an inactive wordline do not participate in the read/write operation from a logic standpoint, although their presence has an electrical effect.

The bit cells that are coupled to a given wordline are collectively referred to as a "word" which can be read or written in the memory as a unit. A word can have any number of bits (or "width"), in various embodiments. To read a word, each bit cell outputs its stored value on one or more bitlines (e.g. bitlines 16A, 16B, and 16C as shown in FIG. 1). That is, each bit cell is coupled to a different bitline or bitlines. A sense amp circuit (SA 18A, 18B, and 18C in FIG. 1) is coupled to each bitline or bitlines, and senses the bits output by the bit cells. The sense amp circuits 18A-18C output the sensed data word as the data output.

A data word is written by supplying the data input and driving the data on the bitlines 16A-16C while the wordline is active, writing the bits of the input word into the selected bit cells. The write drivers 24 coupled to the bitlines 16A-16C drive the data to the selected bit cells. Specifically, the write drivers 24 may comprise separate driver circuits for each bit of the word, coupled to the corresponding bitline or bitlines. The precharge circuits 20A, 20B, and 20C are coupled to the bitlines 16A-16C and precharge the bitlines 16A-16C to a known level (e.g. the power supply voltage, in one embodiment) before a read, so the sense amps 18A-18C may detect the read value via changes in the voltage on the bitlines from the known level (or via the difference between the voltages on a pair of bitlines coupled to the bit cell).

Each bit cell comprises circuitry that is capable of storing one bit of data, supplying the data in response to a read and accepting the data in response to a write. Depending on the type of memory, different bit cells may be included in the memory. The bit cells that are coupled to the same bitline(s) form a column of the memory (e.g. the column 22 indicated by the dashed box in FIG. 1). During a given read/write operation, one bit cell in the column may be activated by the corresponding wordline and other bit cells in the column are inactive.

The memory 10 may have any given size, but often is quite large. For example, a memory having 256 wordlines (and thus 256 bit cells in each column) would be common, as would larger sizes (e.g. 512 wordlines, 1024 wordlines, etc.). Additionally, word widths in the tens of bits or even hundreds of bits would be common. Accordingly, the number of bit cells 14 in the memory 10 is often in the hundreds of thousand, to millions, and more. Thus, millions of transistors must be simulated to simulate the memory 10 as a whole.

A simulator as described herein, in one embodiment, uses a simplified model of the bit cells that are coupled to inactive wordlines, to reduce the number of transistors and/or other nonlinear elements that are simulated to simulate the memory. The simulation may proceed rapidly, in some embodiments, while still providing accurate simulation results. The simplified model includes one or more linear elements (e.g. capacitors, resistors, and/or inductors) in place of nonlinear elements (e.g. transistors) of the bit cell, which approximate the electrical behavior of the inactive bit cell (that is, a bit cell coupled to an inactive wordline).

Figure 2:
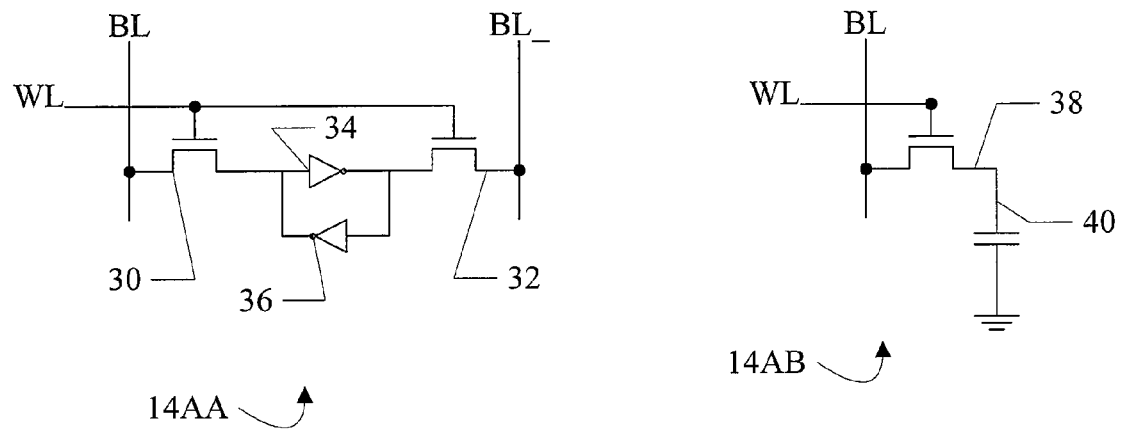
FIG. 2 is a circuit diagram illustrating some embodiments of a bit cell.

Turning now to FIG. 2, a circuit diagram of exemplary bit cells 14AA and 14AB are shown. The exemplary bit cells 14AA and 14AB are exemplary embodiments of a bit cell, and other embodiments may be possible as well. Generally, a bit cell may comprise any storage circuit that is configured to store the binary one or binary zero state of the cell, and any circuitry that is configured to control access to the cell responsive to the wordline.

The bit cell 14AA is a form of static random access memory (SRAM) cell, sometimes referred to as a 6T cell since it generally includes 6 transistors (the two gating transistors 30 and 32 and two transistors each in the inverters 34 and 36). The output of the inverter 34 is coupled to the input of the inverter 36, and the output of the inverter 36 is coupled to the input of the inverter 34. This configuration is often referred to as "cross-coupled" inverters. The cross-coupled inverters hold the state most recently written to the cell. The gating transistors 30 and 32 are coupled to the nodes formed by the cross-coupled inverters and to corresponding bitlines BL and BL_. The bitlines BL and BL_ form a differential pair. For a read operation, the bitlines BL and BL_ are precharged to a voltage (e.g. the power supply voltage or $V_{DD}$), and the wordline is activated. A differential is developed across the pair through discharge of one of the bitlines according to the state stored in the active bit cell. For example, if a binary zero is stored, the BL_ bitline may be discharged and if binary one is stored, the BL bitline may be discharged to develop the differential. For a write operation, the BL and BL_ bitlines are driven responsive to the value being written, and the value propagates though the gating transistors 30 and 32 to write the storage cell formed by the transistors 34 and 36.

The bit cell 14AB is a form of dynamic RAM (DRAM) cell. In the DRAM bit cell 14AB, a gating transistor 38 and a capacitor 40 are used. The gating transistor 38 is coupled to the wordline, and provides access to the capacitor 40 if the wordline is asserted. The capacitor 40 may store the binary zero or binary one value of the cell. In one embodiment, the capacitor 40 may be formed from a transistor, where the gate of the transistor is coupled to the drain of the gating transistor 38 and the source and drain of the transistor are coupled to ground. A Flash memory bit cell may be similar, except that the capacitor may be formed from a floating gate transistor. Other embodiments may form the capacitor 40 in other fashions.

For the remainder of this disclosure, the SRAM bit cell 14AA will be used as an example. However, other embodiments may use similar models and techniques with the DRAM/Flash memory bit cell 14AB, or any other bit cell.

Figure 3:
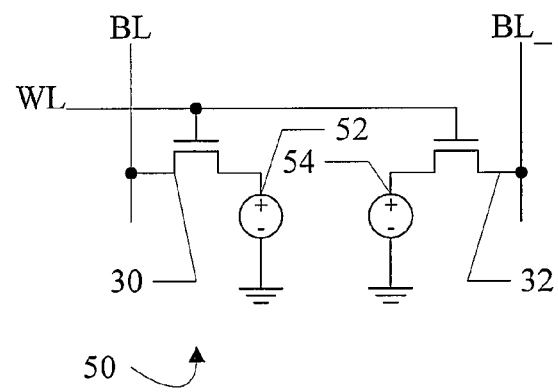
FIG. 3 is a circuit diagram illustrating a simplified embodiment of a bit cell that is coupled to an inactive wordine.

Turning now to FIG. 3, a first embodiment of a simplified bit cell model 50 that may be used for inactive bit cells in a column is shown. As mentioned previously, an inactive bit cell is a bit cell that is coupled to an inactive wordline. Since the wordline is inactive, the transistors 30 and 32 are "off" and the inverters 34 and 36 are merely holding the value stored in the cell against leakage current in the transistors 30 and 32 and/or Miller capacitance or other parasitic effects in the transistors 30 and 32. The operation of the inverters 34 and 36 may be accurately approximated using voltage sources 52 and 54. The voltage on each source 52 and 54 may depend on the value stored in the bit cell 50.

The model 50 replaces 4 nonlinear transistor elements in the inverters 34 and 36 with linear elements, and thus reduces the nonlinear elements in the bit cell from 6 to 2. Since a given column includes at most one active bit cell at any given point in time (assuming that the memory 10 is operating correctly), the reduction in the number of nonlinear elements in the column may be significant (e.g. close to two-thirds reduction).

The active bit cell may be modeled using a full model of the bit cell (e.g. similar to the bit cell 14AA).

Figure 4:
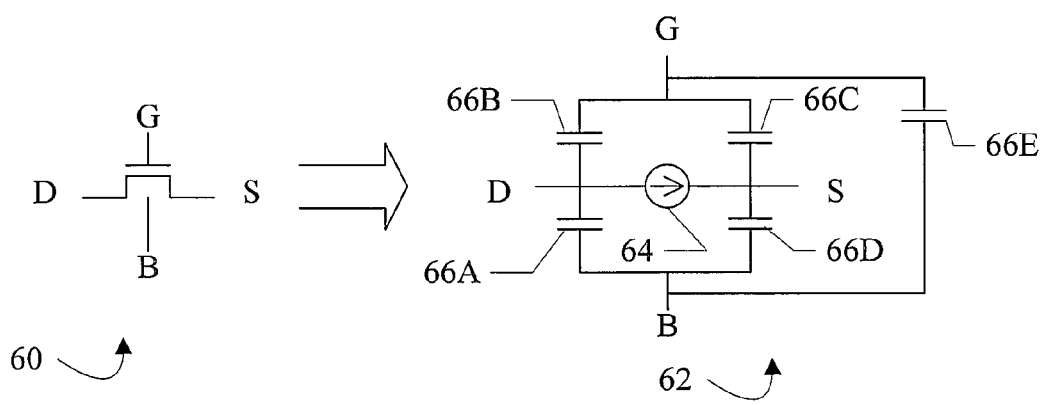
FIG. 4 is a circuit diagram of one embodiment of a transistor and one embodiment of a corresponding companion model.

Additional simplifications may be implemented, in some embodiments, dependent on the companion model used for the transistors 30 and 32. For example, FIG. 4 is one embodiment of a companion model for a transistor. Other companion models may be used in other embodiments. In the embodiment of FIG. 4, an N-type Metal-Oxide-Semiconductor (NMOS) transistor 60 is shown having gate (G), source (S), drain (D), and bulk (B) terminals. Each terminal may be more briefly referred to herein by its name alone (gate, source, drain, and bulk). The companion model 62 includes a voltage controlled current source 64 and five capacitors 66A-66E. Each capacitor is coupled between respective pairs of the terminals: capacitor 66A is coupled between the drain and bulk; capacitor 66B is coupled between the drain and the gate; capacitor 66C is coupled between the gate and the source; capacitor 66D is coupled between the source and bulk; and capacitor 66E is coupled between the gate and bulk.

In one embodiment, the voltage controlled current source 64 may be dependent on the voltage between the gate and the source. If the voltage between the gate and the source is less than a threshold voltage ($V_T$) of the transistor (typically a few tenths of a volt) then the current source 64 is effectively off. Thus, if the wordline (coupled to the gate) is inactive (or ground), the gate to source voltage is either zero or negative and the transistor is effectively off. Since the drain to source current has a nonlinear relationship to the gate to source voltage, the voltage controlled current source 64 may be implemented via a table lookup, an equation, etc.

Figure 5:
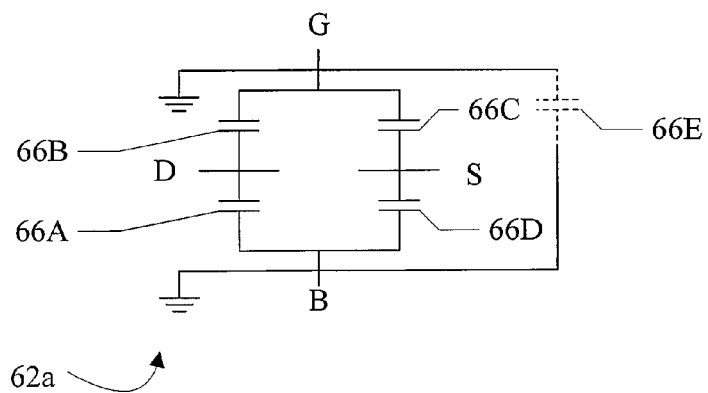
FIG. 5 is a circuit diagram of one embodiment of the companion model shown in FIG. 4, simplified for the case that the wordline is inactive.

FIG. 5 illustrates one embodiment of a simplification of the model 62 (reference numeral 62a) for a transistor having its gate coupled to an inactive wordline (and also having its bulk terminal grounded, which is a typical configuration for an NMOS transistor). Thus, both the gate and bulk are grounded. Since the transistor is effectively off, the current source is effectively an open circuit and is thus deleted from the model 62a. The capacitor 66E, shown in dotted form, may also be deleted from the model since both its terminals are grounded (and thus it does not contribute electrically to the circuit shown in FIG. 5). The capacitors 66A and 66B are in parallel between the drain and ground, and thus their capacitances may be summed to form an effective capacitance between the drain and ground. Similarly, the capacitors 66C and 66D may be summed to form an effective capacitance between the source and ground. However, in the model 62a used for the transistors 30 or 32 in FIG. 3, the source is coupled to the voltage source 52 or 54 and nothing else, so there is no operation by the capacitance during a simulation. Thus, the capacitors 66C and 66D may be deleted from the model. In other embodiments, the wordline signal may remain connected to the gate and some of the capacitance simplifications may not be implemented.

In one embodiment, the bitlines BL and BL_ may be modeled as having no resistance (and possibly no parasitic capacitance). In such an embodiment, the effective capacitance that is the sum of the capacitances of the capacitors 66A-66B is in parallel with a similar effective capacitance corresponding to each other inactive bit cell. Accordingly, all of the effective capacitances may be summed to produce an overall effective capacitance that approximates the electrical effect of all of the inactive bit cells in a given column. If all of the bit cells have the same effective capacitance, the total effective capacitance of the inactive bit cells is n−1 times the effective capacitance of one bit cell, for n wordlines and one wordline active at a time. Additionally, the same model of a column may be used for any active wordline in this case, the difference being whether the bit cell is storing a binary zero or a binary one (the "state" of the bit cell). In one embodiment, a bit cell storing a binary zero and another bit cell storing a binary one may be simulated, and the result from one of the bit cells may be saved as the simulation result for the activate wordline based on the state of the active bit cell. The state of each bit cell in the memory 10 may be held separately from the memory model, and may be used by the simulator to select which result to save.

Figure 6:
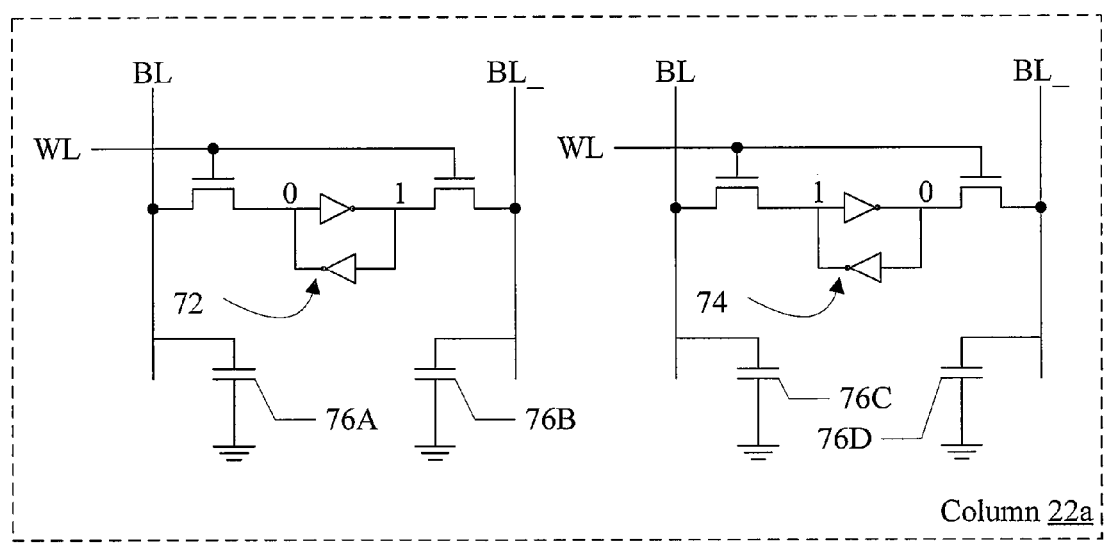
FIG. 6 is a circuit diagram of one embodiment of a two bit cell model for a column of a memory.

For the above embodiment, the model for a column 22 of the memory 10 may be the "two bit cell" model illustrated in FIG. 6. The model may include a model of the column 22 (reference numeral 22a in FIG. 6) as well as the state of each bit cell in the memory 10 (memory state 70 in FIG. 6). The column includes two bit cells coupled to separate instances of the BL and BL_ bitlines, and two instances of the effective capacitances corresponding to the other n−1 bit cells coupled to each of the bitlines. The bit cell model is the full bit cell model of FIG. 2, in this embodiment, storing a binary zero (instance 72) or a binary 1 (instance 74). Alternatively, the companion model 62 of FIG. 4 may be used for the transistors in the full bit cell model, or at least for the transistors 30 and 32. Thus, a total of 12 nonlinear transistor elements would be simulated for column 22 in this embodiment. Each of the capacitors 76A-76D may have an effective capacitance that is the sum of the effective capacitances of the n−1 inactive bit cells. Alternatively, only one instance of the bitlines and capacitors may be included and the selected bit cell instance may be coupled and simulated based on the state of the active bit cell.

Similar instances of the column 22a may be simulated for each other column in the memory 10, in one embodiment. Alternatively, one instance of the column 22a may be simulated, and the binary zero or binary one result for each column may be selected for that column in the memory 10 based on the state of the active bit cell in that column. In other embodiments, the sense amp circuits 18 and/or the precharge circuit 20 for the column may be included in the column model 22a.

It is noted that, at various points in a simulation, there may be no active wordlines in the memory 10. In one embodiment, an additional column model 22b (FIG. 7) may be used for such times in the simulation. The column model 22b includes no active bit cell models (and thus no non-linear elements). The BL and BL bitlines are shown, with capacitors 76E and 76F (having capacitances equal to the sum of the equivalent capacitances of each of the n bit cells in the column, or n times the equivalent capacitance of one bit cell if the bit cells are approximately equal).

Figure 7:
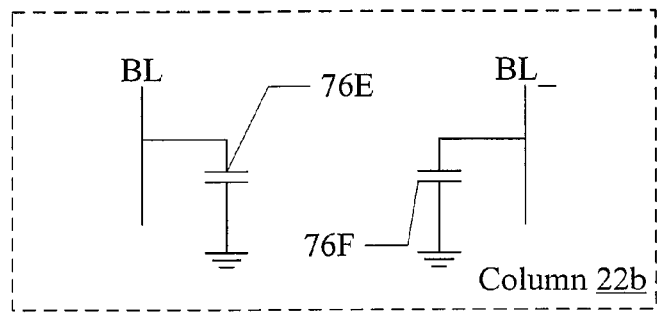
FIG. 7 is a circuit diagram of one embodiment of an inactive column in a memory.
Figure 7:
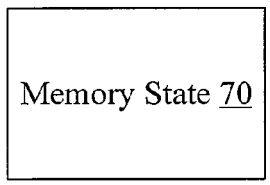
Figure 8:
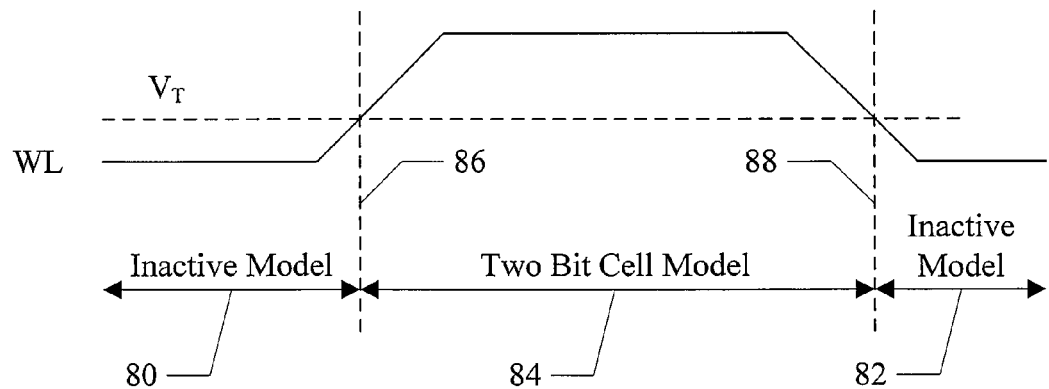
FIG. 8 is a timing diagram illustrating a wordline for a simulation and corresponding time periods in which the inactive model and the two bit cell model are used for one embodiment.

FIG. 8 is a timing diagram illustrating the activation of a wordline in the memory 10, and periods of time during which the inactive model illustrated in FIG. 7 and the two bit cell model illustrated in FIG. 6 are used. A horizontal dotted line illustrates the threshold voltage ($V_T$) of the transistors 30 and 32. During the times that the wordline is inactive, and during the rise to the threshold voltage (or the fall from the threshold voltage), the inactive model is used (arrows 80 and 82). During the rise of the wordline from above the threshold voltage to fully active, the fully active steady state, and the fall of the wordline to the threshold voltage, the two bit cell model is used (arrow 84).

The models may be represented in the simulator by matrices, similar to SPICE representations of circuits. Accordingly, at the times the models are switched (the vertical dashed lines 86 and 88), the simulator may rebuild the matrices representing the memory 10 to switch from one model to the other. Alternatively, each set of matrices may be created prior to the simulation, and the matrices may be retained in memory for the simulator to switch between as needed. Additionally, in some embodiments that implement multi-threaded simulation, different memory columns may be simulated by different threads. However, the model configuration (and reconfiguration), such as the above mentioned matrices, may be reused from one thread to the next. Thus, additional performance improvements may be realized in the multi-threaded mode.

It is noted that, in one embodiment, the model of the memory 10 (and any other circuitry that may be included in the model) may be divided into linear and nonlinear portions. The nonlinear portion may be solved first, using any nonlinear solver method. The linear portion may then be processed in one final solve, since the linear portion generally does not require multiple iterations to converge on a solution.

Figure 9:
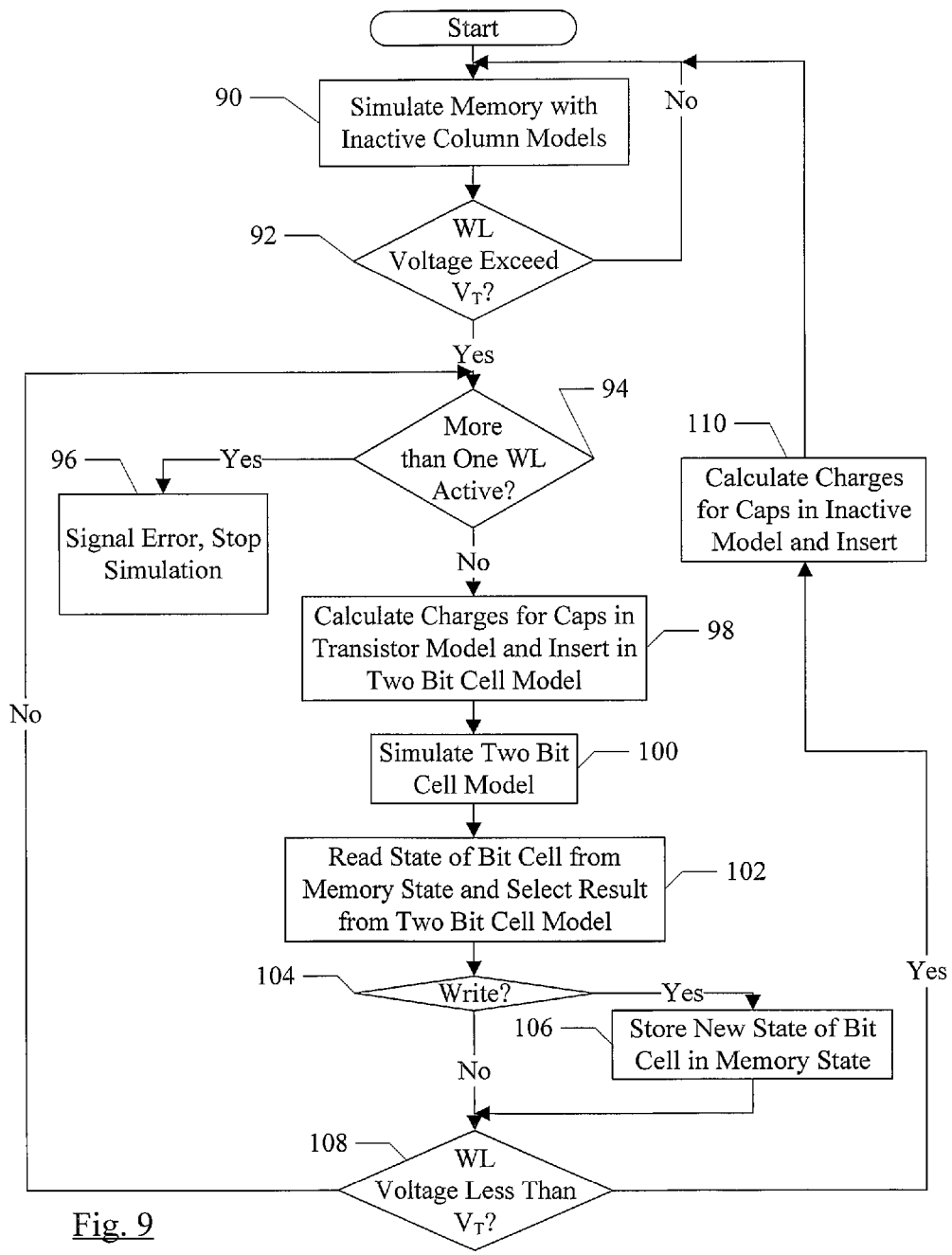
FIG. 9 is flowchart illustrating operation of one embodiment of a simulator to simulate the memory.

Turning now to FIG. 9, a flowchart is shown illustrating operation of one embodiment of a simulator to simulate a memory 10 using models similar to those illustrated in FIGS. 2-8. While the blocks are shown in a particular order for ease of understanding, other orders may be used as desired. The simulator may comprise a plurality of instructions which, when executed on a computer, implement the operation illustrated in FIG. 9. The flowchart of FIG. 9 assumes that the wordlines are inactive at the beginning of the simulation, for simplicity, and thus initially uses the inactive column model of FIG. 7. However, other embodiments may test the wordlines to determine which column model to begin with. Furthermore, other embodiments may use only the two bit cell model, if desired.

The simulator may begin simulating the memory 10, using the inactive column model (block 90). The simulator may monitor the wordlines in the model to detect when at least one of the wordlines exceeds the threshold voltage $V_T$ (decision block 92). If none of the wordlines exceeds the threshold voltage (decision block 92, "no" leg), the simulator may continue the simulation with the inactive column model (block 90). If at least one wordline does exceed the threshold voltage (decision block 92, "yes" leg), the simulator may determine if more than one wordline exceeds the threshold voltage (decision block 94). If so (decision block 94, "yes" leg), the simulator signals an error and stops the simulation (block 96). In other embodiments, the simulator may continue with the simulation, which may provide unpredictable results since two bit cells in the same column may be activated.

If only one wordline is active (decision block 94, "no" leg), the simulator may switch to the two bit cell model. The simulator may use the charge on the capacitors 76E and 76F to calculate the charges that are to be placed on the capacitors 76A-76D and on the capacitors 66A-66E of the companion model 62 for the transistors 30 and 32 (block 98). This calculation may prevent discontinuities in the simulation that might otherwise occur when switching among models. The simulator may then continue simulation with the two bit cell model (block 100). The simulator may read the state of the active bit cell from the memory state 70 and select the appropriate bit cell simulation result from the two bit cell model to be saved (block 102). If a write occurs (decision block 104, "yes" leg), the simulator may store the new state of the bit cell in the memory state 70 (block 106). If the wordline voltage falls below the threshold voltage of the transistor (decision block 108, "yes" leg), the simulator may return to using the inactive column model (block 90). The simulator may also calculate the voltage to apply to the capacitors 76E-76F from the capacitors 76A-76D, similar to block 98 (block 110). If the wordline voltage does not fall below the threshold voltage of the transistor (decision block 108, "no" leg), the simulator may continue simulating with the two transistor model (block 94).

Figure 10:
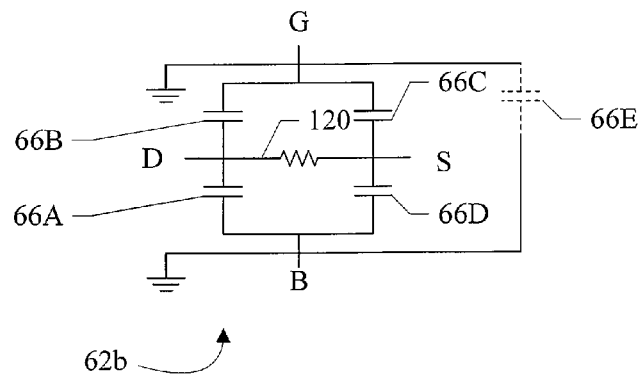
FIG. 10 is a circuit diagram of another embodiment of the companion model shown in FIG. 4, simplified for the case that the wordline is inactive.
Figure 11:
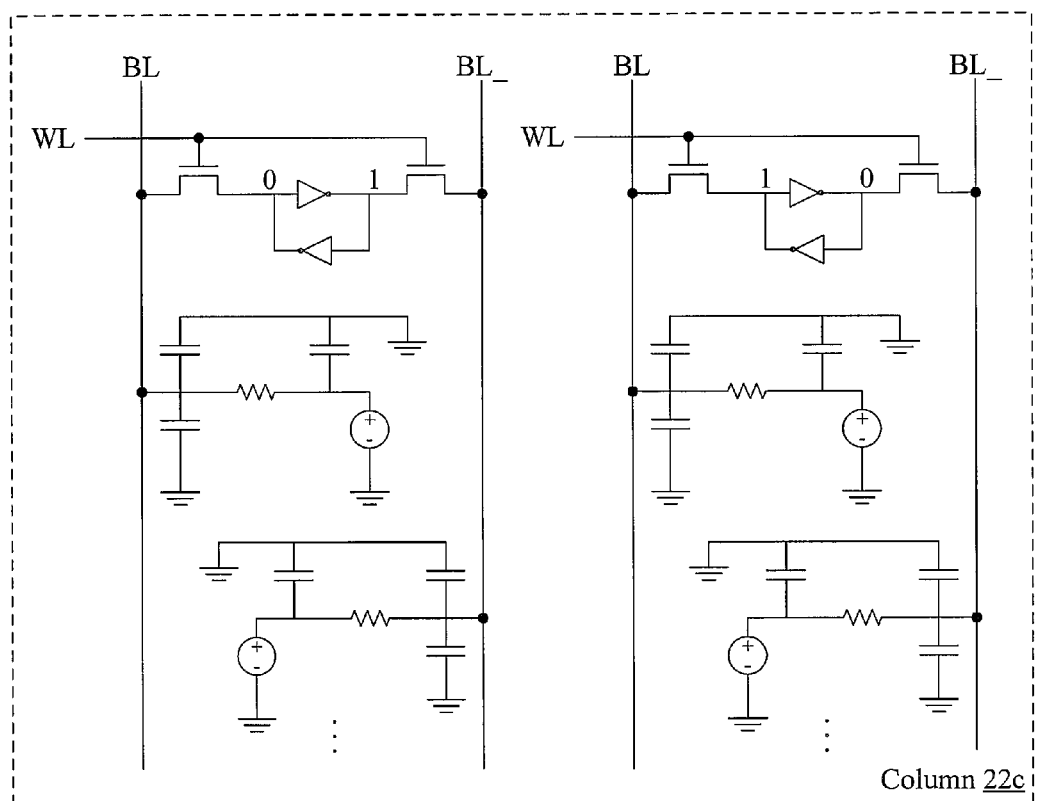
FIG. 11 is a circuit diagram of another embodiment of a two bit cell model for a column of a memory.

Other simplified companion models may be used for the transistors 30 and 32 of the inactive bit cells. For example, FIG. 10 illustrates another companion model 62b for the inactive bit cells, which includes a resistance 120 in addition to the capacitors 66A-66E. The resistance may model the leakage current in the transistor when it is logically turned off (not actively conducting current). Again, the capacitor 66E is coupled between two grounds, and thus may be eliminated. Additionally, the capacitor 66D is in parallel with a voltage source when used with the model 50 shown in FIG. 3, and thus does not contribute to the electrical behavior of the circuit and may be removed. This configuration is illustrated for one active bit cell (each state, for a two bit cell model) and one inactive bit cell in a column model 22c in FIG. 11. With multiple inactive bit cells, parallel and series capacitances (and resistances) may be combined across the cells to further reduce the size of the model 22c.

Figure 12:
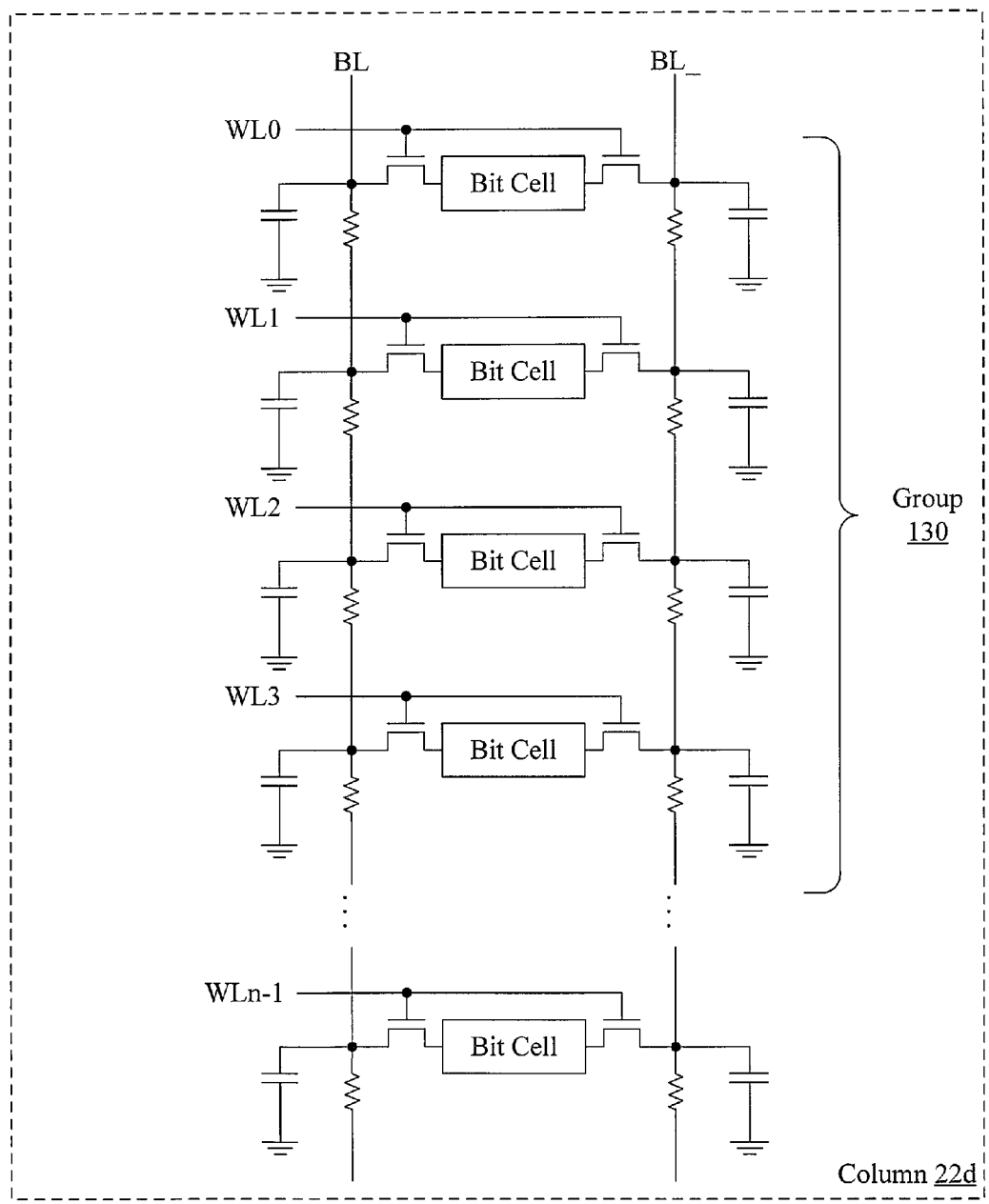
FIG. 12 is a circuit diagram of another embodiment of a model of the column.

The previous models have assumed zero resistance in the bitlines. However, at some phases of the development cycle, resistance values may be available (e.g. post layout phases of the circuit design). If these resistances are included, the model may change somewhat. For example, FIG. 12 illustrates such a model of the column (reference numeral 22d). There is a resistance along the bitlines between each bit cell. In some embodiments, the resistances may be extracted from post layout data and may differ between different bit cells. Alternatively, estimated resistances may be used that may be more uniform between bit cells. Additionally, parasitic capacitance is illustrated along the bitlines as well.

The inactive bit cell models may be inserted into the model 22d, similar to earlier models 22a-22c. Since the placement of the active bit cell in the column affects the simulation result (since the net resistance and capacitance above and below the bit cell differs), reduction of the series and parallel capacitances and resistances may not be implemented and instead the active bit cell may be swapped into the model 22d in place of a corresponding inactive bit cell. On the other hand, in some embodiments, one or more nearby bit cells may be grouped and may be considered similar enough to use the same bit cell model with nearby resistance and capacitance measurements. While the simulation will vary somewhat from the more accurate model, the accuracy of the simulation may be sufficient for design purposes.

As an example, a group of four bit cells (reference numeral 130) may be considered the same, and the same active bit cell model (and surrounding resistance/capacitance values) may be used if any of the corresponding wordlines WL0 to WL3 activate. If the wordline WLn−1 activates, however, a different active bit cell model may be used since the bit cell for wordline WLn−1 is not in the same group 130 as the other bit cells. Thus, there may be multiple two bit cell models, one for each group of bit cells.

Figure 13:
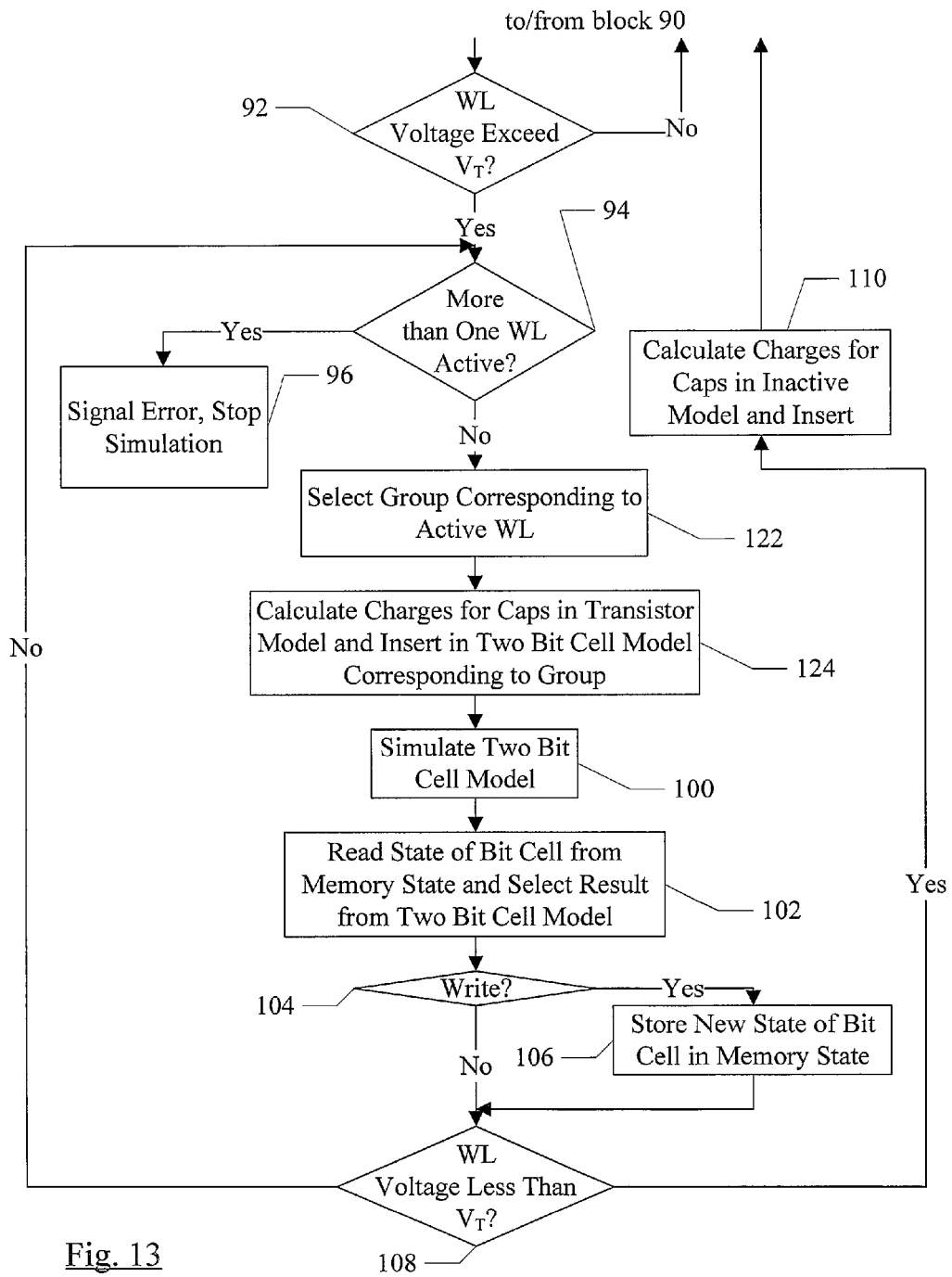
FIG. 13 is flowchart illustrating operation of another embodiment of a simulator to simulate the memory.

It is noted that, while the embodiment of FIG. 13 shows a resistance and capacitance parasitic configuration for the bitlines, parasitic impedance may be modeled via any parasitic configuration, which may include any parallel and/or series combination of resistance, capacitance, and/or inductance.

Additionally, if the inactive wordlines are modeled as ground connections, as shown, further reductions of parallel capacitances (e.g. capacitors 66A-66B) may be performed. In other embodiments, the individual wordline signals may still be connected and such reductions may not be performed.

The simulator 10, to implement the model of FIG. 12, may be similar to the embodiment shown in FIG. 9, including simulation using the inactive model (not shown in FIG. 13). Other portions of FIG. 9 that are similar are shown in FIG. 13 as well, and are numbered the same as corresponding steps in FIG. 13 (blocks 92, 94, 96, 100, 102, 104, 106, 108, and 110). Additionally, once a single wordline activation is detected (decision block 94, "no" leg), the simulator may identify the group corresponding to the active wordline (block 122) and may calculate the charges for the capacitances in the two bit cell model that corresponds to the identified group and apply the charges (block 124).

Figure 14:
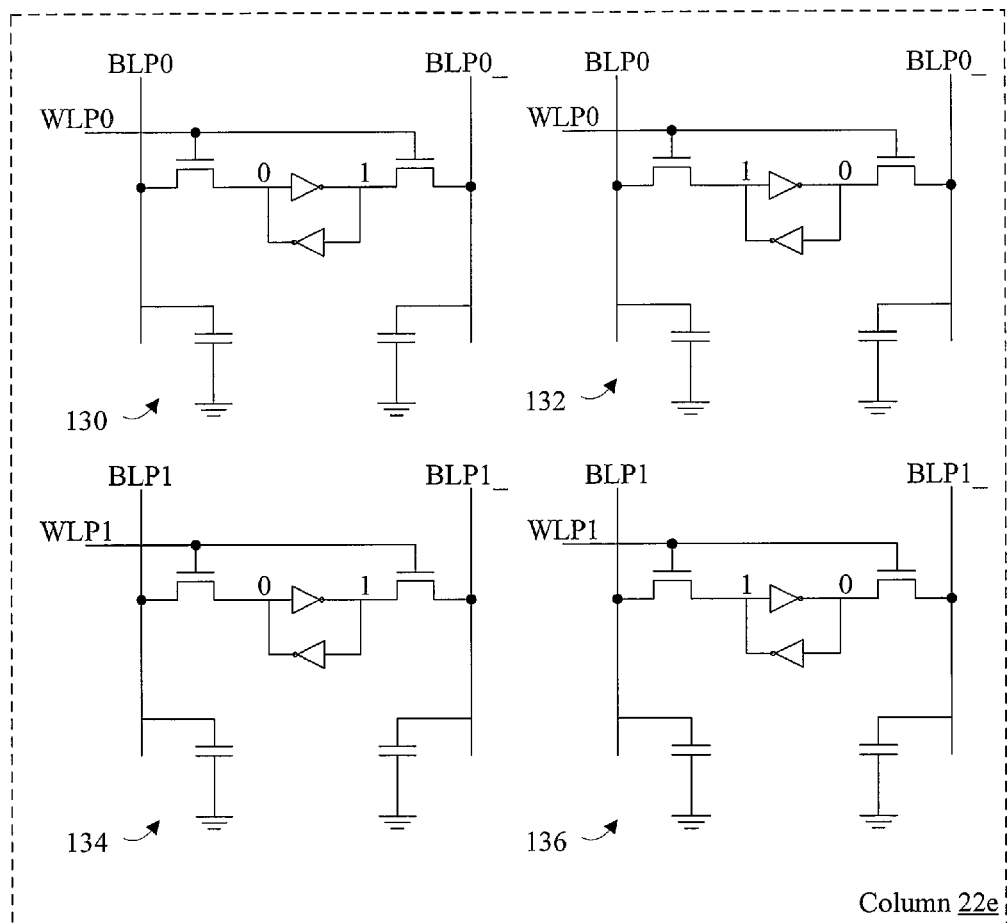
FIG. 14 is a circuit diagram of another embodiment of a model for the column for a two port memory.

While the preceding description has referred to a single ported embodiment, multiported embodiments may be supported as well. One mechanism to support multiported embodiments would be to include multiple copies of the memory model for the memory 10, one for each port. In another embodiment, the "two bit cell model" may include two bit cells for each port, with separate bitlines and wordlines for each port. For example, FIG. 14 is an example of a model of a column 22e for two bit cell models similar to the one shown in FIG. 6. One port includes the wordline for port 0 (WLP0) and corresponding bitlines for port 0 (BLP0 and BLP0_). The other port includes the wordline for port 1 (WLP1) and corresponding bitlines for port 1 (BLP1 and BPL1_). As can be seen, two bit cells (one for each state) can be supported for each port (reference numerals 130 and 132 for port 0 and reference numerals 134 and 136 for port 1). Thus, concurrent port accesses may be properly simulated. It is noted that, while two bit cells may be provided to simulate the two ports, the content of the memory is the same for both ports (since in the actual memory, the two ports are accessing the same sets of bit cells). Thus, the data (e.g. in the memory state 70) may include only one value for each actual bit cell, and the correct value may be selected for each port from the common data source. Memories having more than two ports may similarly be supported with additional instances of the two bit cells with additional wordlines and bitlines.

Figure 15:
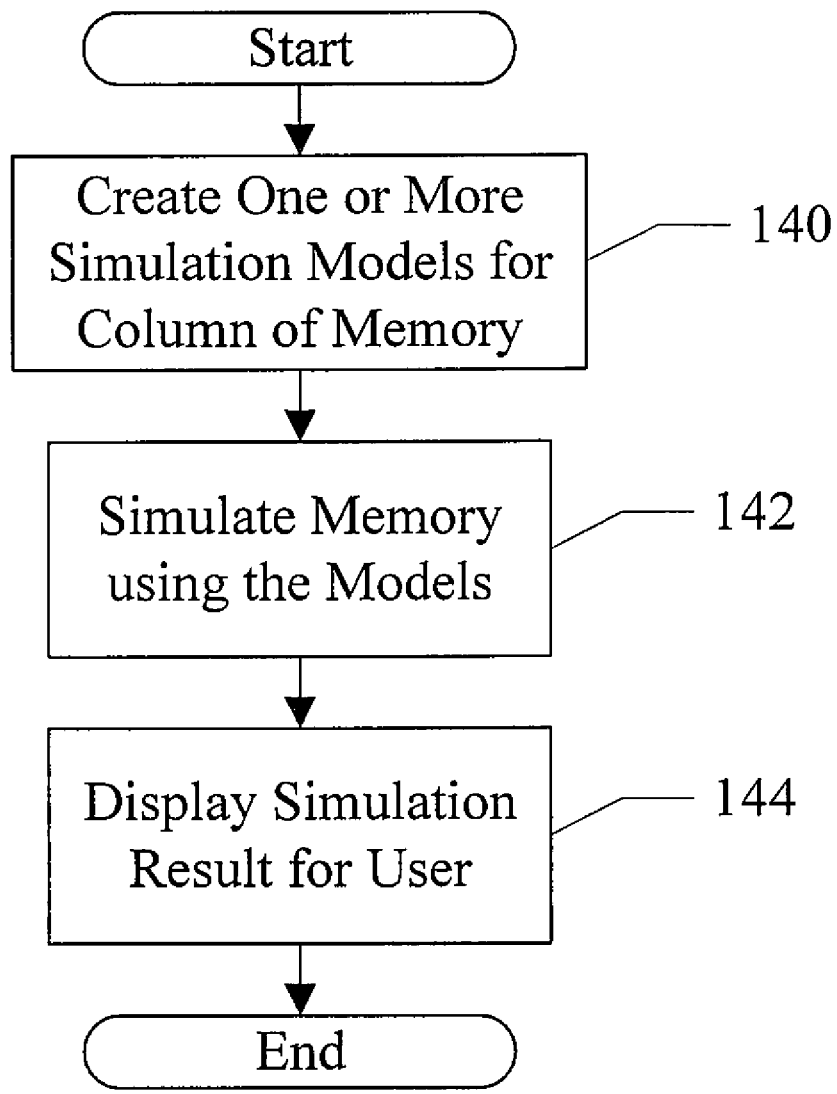
FIG. 15 is a flowchart illustrating a method of simulating a memory.

FIG. 15 is a high level flowchart of the operation of a simulator that may implement the memory simulation techniques described herein. The simulator may comprise a plurality of instructions which, when executed on a computer, implement the operation illustrated in FIG. 15. The simulator may create one or more simulation models for the columns of a memory, according to the various embodiments described above (block 140). The simulator may simulate the memory using the models (e.g. as illustrated in FIG. 9 and/or FIG. 13—block 142), generating a simulation result. The simulator may display the simulation result for the user (block 144). For example, the display may include graphic display of waveforms representing currents and/or voltages; tables of values calculated from the model; pass/fail determinations; etc. The display may also be implemented by storing the simulation result in a file that can be accessed by the user.

It is noted that, while NMOS transistors are used as gating transistors in the illustrated embodiments, other embodiments may use other transistor types.

Computer Medium and System

Figure 16:
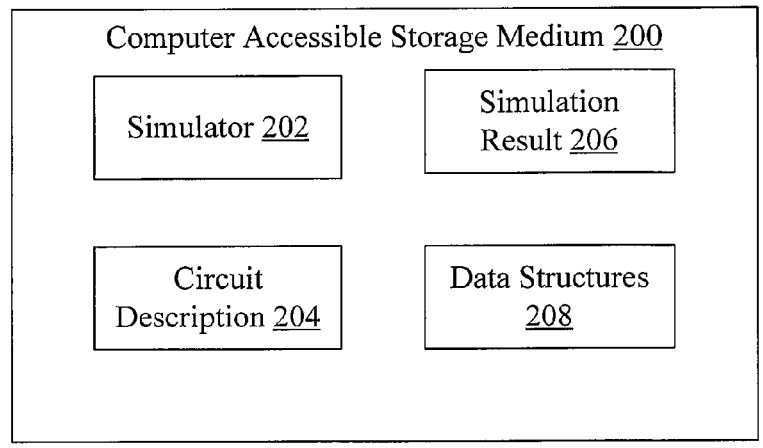
FIG. 16 is a block diagram of one embodiment of a computer accessible storage medium.

Turning now to FIG. 16, a block diagram of a computer accessible storage medium 200 is shown. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, or DVD-ROM, CD-R, CD-RW, DVD-R, DVD-RW, volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc., microelectromechanical systems (MEMS), etc. The media may be insertable into the computer, integrated into the computer (e.g. a fixed disk or RAM), or coupled to the computer via a communication medium such as a network and/or a wireless link. A carrier medium may include computer accessible storage media as well as transmission media such as wired or wireless transmission.

The computer accessible storage medium 200 in FIG. 16 may store one or more of a simulator 202, a simulation result 206, a circuit description 204 of the memory 10, and/or data structures 208. The data structures 208 may comprise structures used during simulation such as the memory state 70, solution matrices, etc. The simulator 202 may comprise instructions which, when executed, implement the operation described herein for the simulator 202 (e.g. FIGS. 9, 13, and/or 15). Generally, the computer accessible storage medium 200 may store any set of instructions which, when executed, implement a portion or all of the flowcharts shown in one or more of FIGS. 9, 13, and/or 15.

Figure 17:
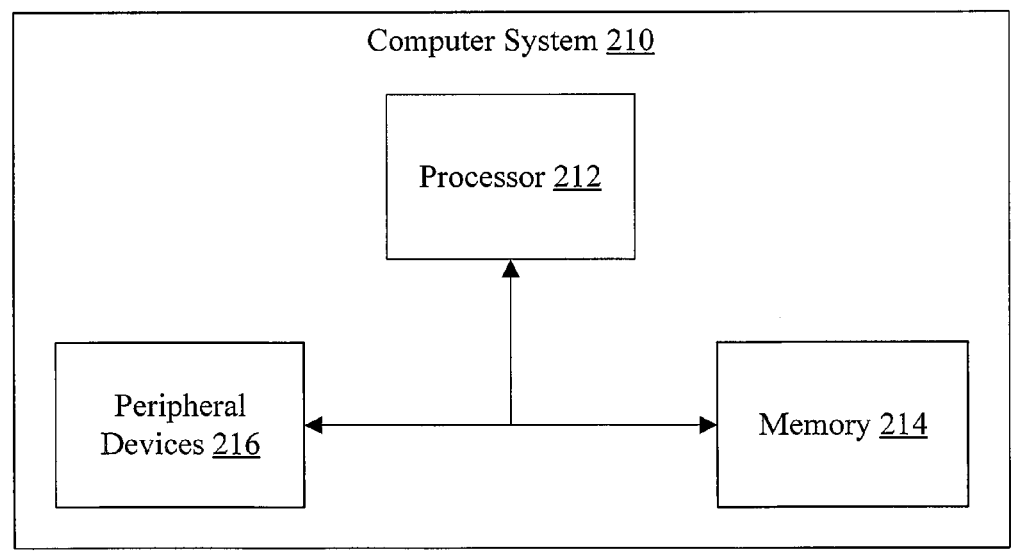
FIG. 17 is a block diagram of one embodiment of a computer system.

FIG. 17 is a block diagram of one embodiment of an exemplary computer system 210. In the embodiment of FIG. 17, the computer system 210 includes a processor 212, a memory 214, and various peripheral devices 216. The processor 212 is coupled to the memory 214 and the peripheral devices 216.

The processor 212 is configured to execute instructions, including, in one embodiment, the instructions in the software described herein. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to couple the processor 212, the memory 214, and the peripheral devices 216, creating multiple connections between these components.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use (including the instructions implementing the software described herein), data to be operated upon by the processor 212 during use, etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
   creating a transient simulation model for a column of bit cells in a memory, wherein each of the bit cells in the column is coupled to a different wordline, and wherein the transient simulation model comprises the selection of one or more linear devices in place of a nonlinear device in each bit cell that is coupled to an inactive wordline, and wherein the one or more linear devices approximate a behavior of the nonlinear device while the wordline is inactive;
   simulating the transient simulation model to generate a result based upon, at least in part, a user input stimulus, wherein none of the wordlines are active during at least a portion of the simulation, and wherein each bit cell in the column is modeled in the simulation model with the linear devices replacing the nonlinear device for at least the portion of the simulation; and
   displaying the result for a user.

2. The method as recited in claim 1 wherein one of the wordlines is active during a portion of the simulation, and wherein the simulation model comprises a bit cell model for the bit cell that is coupled to the active wordline during at least the portion of the simulation.

3. The method as recited in claim 2 wherein the simulation model comprises two bit cells, wherein one of the two bit cells stores a binary one state for the bit cell and the other one of the two bit cells stores a binary zero, and wherein the simulating comprises selecting one of the two bit cells based on a stored state for the bit cell that is coupled to the active wordline, and wherein the stored state is stored separate from the column.

4. The method as recited in claim 3 wherein the simulating comprises detecting a write operation with the wordline active, and updating the stored state for the bit cell responsive to the detecting.

5. The method as recited in claim 3 wherein the memory is multi-ported, and wherein the simulation model comprises two bit cells per port.

6. The method as recited in claim 3 wherein the memory is modeled with no resistance on one or more bitlines in the column, and wherein a same bit cell model is used for any active wordline.

7. The method as recited in claim 3 wherein the memory is modeled with resistance on one or more bitlines in the column, and wherein the creating comprises creating more than one configuration of the two bit cells within the column, and wherein the simulating comprises selecting one of the configurations responsive to which wordline is active.

8. The method as recited in claim 3 wherein the bit cells are grouped in groups having approximately the same parasitic configuration, and wherein the simulation comprises selecting a given parasitic configuration for any active wordline in the group.

9. The method as recited in claim 1 wherein each bit cell comprises one or more transistors forming a storage circuit to store the bit in the bit cell, and wherein the simulation model comprises voltage sources in place of the transistors.

10. The method as recited in claim 9 wherein each bit cell comprises at least one gating transistor between the storage circuit and one or more bitlines, and wherein the simulation model comprises one or more capacitors in place of the gating transistor.

11. The method as recited in claim 10 wherein each bit cell comprises at least one resistor in addition to the capacitors.

12. A non-transitory computer accessible storage medium storing a plurality of instructions which, when executed:
   create a transient simulation model for a column of bit cells in a memory, wherein each of the bit cells in the column is coupled to a different wordline, and wherein the transient simulation model comprises the selection of one or more linear devices in place of a nonlinear device in each bit cell that is coupled to an inactive wordline, and wherein the one or more linear devices approximate a behavior of the nonlinear device while the wordline is inactive;
   simulate the transient simulation model to generate a result, based upon, at least in part, a user input stimulus, wherein none of the wordlines are active during at least a portion of the simulation, and wherein each bit cell in the column is modeled in the simulation model with the linear devices replacing the nonlinear device for at least the portion of the simulation; and
   display the result for a user.

13. The computer accessible storage medium as recited in claim 12 wherein one of the wordlines is active during a portion of the simulation, and wherein the simulation model comprises a bit cell model is for the bit cell that is coupled to the active wordline during at least the portion of the simulation.

14. The computer accessible storage medium as recited in claim 13 wherein the simulation model comprises two bit cells, wherein one of the two bit cells stores a binary one state for the bit cell and the other one of the two bit cells stores a binary zero, and wherein the simulating comprises selecting one of the two bit cells based on a stored state for the bit cell that is coupled to the active wordline, and wherein the stored state is stored separate from the column.

15. The computer accessible storage medium as recited in claim 14 wherein the simulating comprises detecting a write operation with the wordline active, and updating the stored state for the bit cell responsive to the detecting.

16. The computer accessible storage medium as recited in claim 14 wherein the memory is multi-ported, and wherein the simulation model comprises two bit cells per port.

17. The computer accessible storage medium as recited in claim 12 wherein each bit cell comprises one or more transistors forming a storage circuit to store the bit in the bit cell, and wherein the simulation model comprises voltage sources in place of the transistors.

18. The computer accessible storage medium as recited in claim 17 wherein each bit cell comprises at least one gating transistor between the storage circuit and one or more bitlines, and wherein the simulation model comprises one or more capacitors in place of the gating transistor.

19. A method comprising:
   creating a transient simulation model for a column of bit cells in a memory wherein each of the bit cells in the column is coupled to a different wordline, and wherein the transient simulation model comprises the selection of one or more linear devices in place of a nonlinear device in each bit cell that is coupled to an inactive wordline, and wherein the one or more linear devices approximate a behavior of the nonlinear device while the wordline is inactive;

simulating the transient simulation model to generate a result based upon, at least in part, a user input stimulus, wherein one of the wordlines is active during a portion of the simulation, and wherein the simulation model comprises a bit cell model for the bit cell that is coupled to the active wordline during at least the portion of the simulation;

displaying the result for a user.

20. The method as recited in claim 19 wherein none of the wordlines are active during at least a portion of the simulation, and wherein each bit cell in the column is modeled in the simulation model with the linear devices replacing the nonlinear device for at least the portion of the simulation.

21. The method as recited in claim 19 wherein the simulation model comprises two bit cells, wherein one of the two bit cells stores a binary one state for the bit cell and the other one of the two bit cells stores a binary zero, and wherein the simulating comprises selecting one of the two bit cells based on a stored state for the bit cell that is coupled to the active wordline, and wherein the stored state is stored separate from the column.

22. The method as recited in claim 21 wherein the simulating comprises detecting a write operation with the wordline active, and updating the stored state for the bit cell responsive to the detecting.

23. The method as recited in claim 21 wherein the memory is multi-ported, and wherein the simulation model comprises two bit cells per port.

24. The method as recited in claim 21 wherein the memory is modeled with no resistance on one or more bitlines in the column, and wherein a same bit cell model is used for any active wordline.

25. The method as recited in claim 21 wherein the memory is modeled with resistance on one or more bitlines in the column, and wherein the creating comprises creating more than one configuration of the two bit cells within the column, and wherein the simulating comprises selecting one of the configurations responsive to which wordline is active.

26. The method as recited in claim 21 wherein the bit cells are grouped in groups having approximately the same parasitic configuration, and wherein the simulation comprises selecting a given parasitic configuration for any active wordline in the group.

27. The method as recited in claim 19 wherein each bit cell comprises one or more transistors forming a storage circuit to store the bit in the bit cell, and wherein the simulation model comprises voltage sources in place of the transistors.

28. The method as recited in claim 27 wherein each bit cell comprises at least one gating transistor between the storage circuit and one or more bitlines and wherein the simulation model comprises one or more capacitors in place of the gating transistor.

29. The method as recited in claim 28 wherein each bit cell comprises at least one resistor in addition to the capacitors.

* * * * *